United States Patent
Lu et al.

(10) Patent No.: US 10,095,875 B2
(45) Date of Patent: Oct. 9, 2018

(54) MULTI-LEVEL ACCESS CONTROL FOR DISTRIBUTED STORAGE SYSTEMS

(71) Applicant: VMware, Inc., Palo Alto, CA (US)

(72) Inventors: Yunshan Lu, San Jose, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 259 days.

(21) Appl. No.: 14/839,815

(22) Filed: Aug. 28, 2015

(65) Prior Publication Data

US 2017/0061146 A1 Mar. 2, 2017

(51) Int. Cl.
*H04L 29/06* (2006.01)
*G06F 21/62* (2013.01)
*G06F 21/60* (2013.01)

(52) U.S. Cl.
CPC ........ *G06F 21/6218* (2013.01); *G06F 21/604* (2013.01)

(58) Field of Classification Search
CPC ............................. G06F 21/604; G06F 21/6218
See application file for complete search history.

(56) References Cited

U.S. PATENT DOCUMENTS

| | | | | |
|---|---|---|---|---|
| 6,772,209 B1 * | 8/2004 | Chernock | ......... | H04L 29/06027 709/225 |
| 2003/0187853 A1 * | 10/2003 | Hensley | ................ | G06Q 10/10 |
| 2005/0138110 A1 * | 6/2005 | Redlich | ............ | C07K 14/70575 709/201 |
| 2009/0300710 A1 * | 12/2009 | Chai | ................... | G06F 21/6218 726/1 |
| 2011/0270886 A1 * | 11/2011 | An | ....................... | G06F 17/3007 707/785 |
| 2011/0321123 A1 * | 12/2011 | Ishikawa | ............... | G06F 21/604 726/1 |
| 2012/0030242 A1 * | 2/2012 | Nakamura | .......... | G06F 21/6218 707/781 |
| 2013/0124503 A1 * | 5/2013 | Ishii | .................. | G06F 17/30091 707/722 |
| 2013/0325823 A1 * | 12/2013 | Resch | ................. | G06F 17/3023 707/695 |
| 2014/0380040 A1 * | 12/2014 | Albahdal | .............. | H04L 9/3247 713/155 |

* cited by examiner

*Primary Examiner* — Khoi V Le
(74) *Attorney, Agent, or Firm* — Loza & Loza, LLP (57) ABSTRACT

System and method for accessing a distributed storage system uses a storage-level access control process at a distributed file system that interfaces with the distributed storage system to determine whether a particular client has access to a particular first file system object using an identifier of the particular client and storage-level access control rules in response to a file system request from the particular client to access a second file system object in the particular first file system. The storage-level access control rules are defined for a plurality of clients and a plurality of first file system objects of the distributed storage system to allow the particular client access to the second file system object in the particular first file system object only if the particular client has been determined to have access to the particular first file system object according to the storage-level access control rules.

14 Claims, 6 Drawing Sheets

MULTI-LEVEL ACCESS CONTROL FOR DISTRIBUTED STORAGE SYSTEMS

BACKGROUND

Currently, there is an unprecedented need for scalable high performance storage and data management, partly due to the wide use of cloud computing. Large distributed storage systems have been developed to satisfy this need for scalable high performance storage and data management. Some of these large distributed storage systems may support a number of tenants, each of which may include one or more clients. Such large distributed storage systems provide isolated storage services to the different tenants. In order to provide these isolated storage services, the distributed storage systems utilize authentication schemes so that each tenant can access the storage services dedicated to that tenant. Some of the distributed storage systems require each tenant to use a provider specific authentication scheme.

Although isolated storage services are desired for most situations involving tenants, there are situations where it may be desirable to share at least some of the storage services for a particular tenant with clients external to that particular tenant. In addition, having the tenants convert to a provider specific authentication scheme is often inconvenient and sometimes impossible.

BRIEF DESCRIPTION OF THE DRAWINGS

Throughout the description, similar reference numbers may be used to identify similar elements.

DETAILED DESCRIPTION

Figure 1:
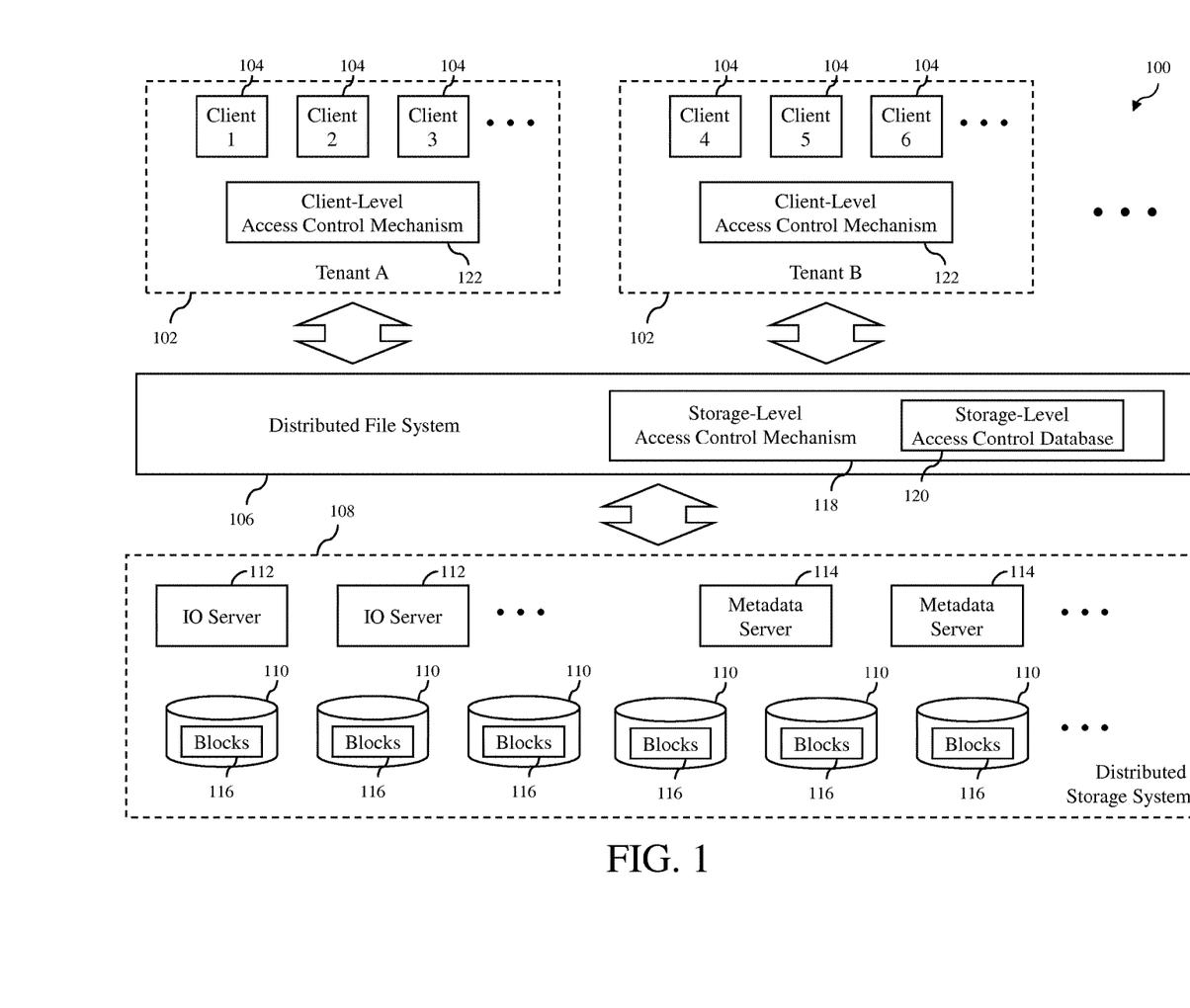
FIG. 1 is a block diagram of a distributed computer system in accordance with an embodiment of the invention.

FIG. 1 depicts a distributed computer system 100 in accordance with an embodiment of the invention is shown. The distributed computer system includes multiple tenants 102 with one or more clients 104, a distributed file system 106 and a distributed storage system 108. As used herein, a "client" can be any software entity that can run on a computer system, such as a software application, a software process, a virtual machine (VM) or a "virtual container" that provides system-level process isolation. The distributed storage system can be accessed by the clients of the various tenants via the distributed file system to perform data operations on the distributed storage system. As described in more detail below, the distributed computer system provides a multi-level access control for the distributed storage system so that specific clients have access to specific file objects stored in the distributed storage system for specific file system operations regardless of the tenants to which the specific clients belong.

As shown in FIG. 1, the distributed storage system 108 includes computer data storage devices 110, input/output (IO) servers 112 and metadata servers 114. The distributed storage system is scalable, and thus, the number of data storage devices, IO servers and metadata servers included in the storage system can be changed as needed to increase or decrease the capacity of the storage system to support increase/decrease in workload. Consequently, the exact number of data storage devices, IO servers and metadata servers included in the storage system can vary from tens to hundreds or more.

The data storage devices 110 of the distributed storage system 108 can be any type of non-volatile storage devices that are commonly used for data storage. As an example, the data storage devices may be, but not limited to, solid-state devices (SSDs), hard disks or a combination of the two. The storage space provide by the data storage devices is divided into storage blocks 116, which may be disk blocks, disk sectors or other storage device sectors.

The IO servers 110 of the distributed storage system 108 operate to facilitate data operations with respect to the data storage devices. The IO servers may manage low-level data storage tasks, such as request scheduling and data layout. In some embodiments, the IO servers may organize data and present a simple object-based data access interface to the rest of the distributed computer system 100.

The metadata servers 114 of the distributed storage system 108 operate to facilitate metadata operations associated with the storage blocks 116 of the data storage devices 110, including metadata that indicates which storage blocks of the data storage devices have been allocated and which storage blocks of the data storage devices are free or available for allocation. This type of metadata is sometimes referred to herein as storage block allocation metadata. In some embodiments, the metadata servers are the same IO servers described above. The ability to separate metadata and IO data paths opens doors to further performance optimizations, as the access patterns of metadata and data are usually distinct.

The distributed file system 106 operates to present storage resources of the distributed storage system 108 as file systems, which include hierarchies of file system objects, such as file system volumes, file directories, folders and files, to the different clients 104 for shared access. Thus, the distributed file system organizes the storage resources of the distributed storage system into the file systems so that the clients can access the file system objects for various file system operations, such as creating file objects, deleting file objects, writing or storing file objects and reading or retrieving file objects.

The distributed file system 106 includes a storage-level access control mechanism 118. The storage-level access control mechanism provides a part of the multi-level access control of the distributed computer system 100. The storage-level access control mechanism operates to control access with respect to the clients and the file system objects, such as file system volumes, which is referred to herein as a storage-level access control process. The storage-level access control mechanism may limit access to one or more file system operations, such as read operations, write operations and create file object operations. In other words, the storage-level access control mechanism may define file system operations that can be performed for a client that has access to a file system object, i.e., an access relationship between one client and one file system object. This parameter is referred to herein as an access capability. The storage-level access control mechanism uses storage-level access control rules that specify which clients can access which file system objects with which access capabilities.

In an embodiment, the storage-level access control mechanism 118 uses client sets, file system object sets and the access capabilities to derive the storage-level access control rules. In this embodiment, the file system object sets will be described as sets of file system volumes, or volume sets. A volume set is defined as an arbitrary set of file system volumes. One file system volume can belong to any number of volume sets. Similarly, a client set includes an arbitrary set of clients and one client can belong to any number of client sets. A client set can contain other client sets. Between every client set and volume set, an access capability is defined. In this embodiment, a client can see the file system volume mounted inside the mounting point (e.g. /mnt/dfs) only if it has access to the volume. The information regarding the client sets, the file system object sets and the access capabilities may be maintained in a storage-level access control database 120, which may be stored in the root file system volume of the distributed file system 106. Since the clients 104 are mounted to the distributed storage system 108 via the distributed file system 106 and the file system objects are known to the distributed file system, the storage-level access control mechanism can determine the clients associated with storage access requests using client identifications, such as VM identification (VMID), and determine the target file system objects, such as file system volumes, associated with the requests to provide effective access control.

As noted above, each of the tenants 102 includes one or more clients 104, which can access the distributed storage system 108 via the distributed file system 106. The tenants may belong different organizations or companies and the clients of the tenants may execute applications or other software programs for the organizations or companies. The clients of each tenant may be running in one or more host computers, which may be located at different locations. An example of such host computer is shown in FIG. 2.

Figure 2:
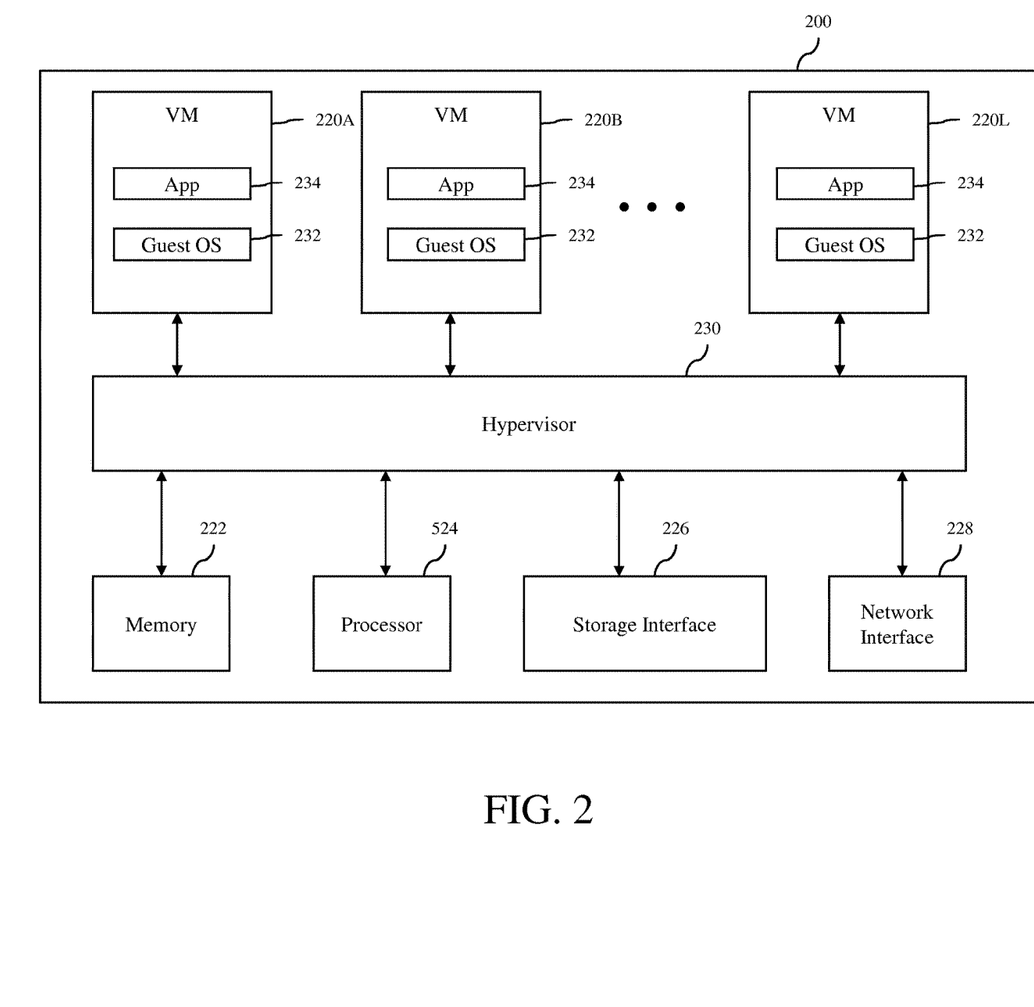
FIG. 2 is a block diagram of a host computer that can support clients of the distributed computer system in accordance with an embodiment of the invention.

FIG. 2 shows a host computer 200 that can support a number of clients 220A, 220B . . . 220L (where L is a positive integer). In this embodiment, the clients are VMs. However, in other embodiments, the clients supported by the host computer may "virtual containers" or other processing entities. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 222, one or more processors 224, a storage interface 226, and a network interface 228. In FIG. 2, the physical connections between the various components of the host computer are not illustrated. Each system memory 222, which may be random access memory (RAM), is the volatile memory of the host computer. Each processor 224 can be any type of a processor, such as a central processing unit (CPU) commonly found in a server. In some embodiments, each processor may be a multi-core processor, and thus, includes multiple independent processing units or cores. The storage interface 226 is an interface that allows that host computer to communicate with storage. As an example, the storage interface may be a host bus adapter or a network file system interface. The network interface 228 is an interface that allows the host computer to communicate with other devices connected to the same network. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232 and one or more guest applications 234. The guest operating system manages virtual system resources made available to the corresponding VM by the hypervisor, and, among other things, the guest operating system forms a software platform on top of which the guest applications run.

Turning back to FIG. 1, each tenant 102 includes a client-level access control mechanism 122. The client-level access control mechanism provides another part of the multi-level access control of the distributed computer system 100. The client-level access control mechanism operates to provide fine grained access control at the clients of tenants, which is referred to herein as a client-level access control process. In particular, the client-level access control mechanism provides a finer-grained access control than the storage-level access control mechanism. As an example, the client-level access control mechanism may provide access to a file or file directory, while the storage-level access control mechanism may provide access to the file system volume under which that file or file directory belongs. Thus, the storage-level access control mechanism provides access control to one or more file system objects and the client-level access control mechanism provide access control to a file system object in one of these file system objects.

The distributed computer system 100 allows each tenant or a set of clients within a tenant to choose the type of client-level access control mechanism or no client-level access control mechanism to be used for the respective clients. Thus, the client-level access control mechanisms 122 utilized in the tenants and/or sets of clients can be different. In some embodiments, the client-level access control mechanisms use access control list schemes. As an example, the client-level access control mechanisms may use local passwords, Lightweight Directory Access Protocol (LDAP), OpenLDAP, Active Directory or other known authentication means to provide client-level access control.

One example of a client-level access control process involves an in kernel file system, such as Linux v9fs, which is a Plan 9 File Protocol (9P) client. The authentication is enforced by client kernel (login via local password file or LDAP). The authorization is enforced by a client file system such as v9fs by interpreting the per object metadata stored in the underlying storage system, i.e., the distributed storage system 108. In particular, the 9P client of the distributed file system stores Portable Operating System Interface (POSIX) Access Control Lists (ACLs) as extended attributes in the distributed file system 106.

The combination of client-level access control and storage-level access control provides a secure sharable file system that is both flexible and scalable. In particular, the file system of the distributed computer system 100 can support numerous sets of clients or tenants. Additionally, the file system can support sets of clients or tenants that use different client-level access control mechanisms, which may be OS dependent. Thus, the file system allows tenant administrators to choose the client-level access control mechanisms for their set or sets of clients.

Figure 3:
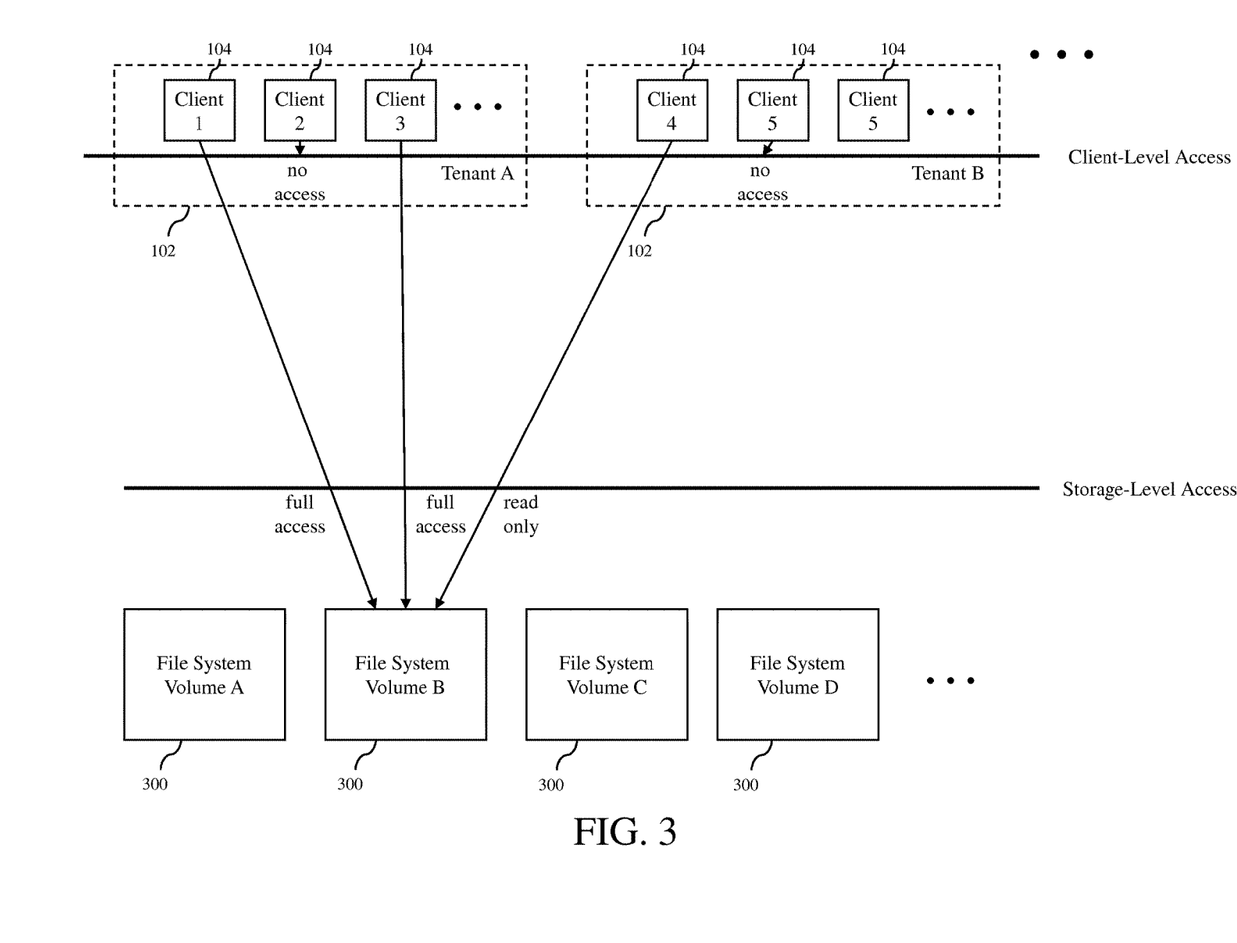
FIG. 3 is a diagram illustrating different clients of the distributed computer system trying to access file system objects in a file system volume in accordance with an embodiment of the invention.

FIG. 3 illustrates the multi-level access control of the distributed computer system 100. In this figure, a number of file system volumes 300 organized by the distributed file system is shown. As shown in FIG. 3, the clients 1, 2 and 3 in the tenant A and the clients 4 and 5 in the tenant B are trying to access file system objects in the file system volume B. The client 2 of the tenant A and the client 5 of the tenant B did not pass through both the client-level access, which is controlled by the client-level access control mechanism 122 at the respective tenant, and the storage-level access, which is controlled by the storage-level access control mechanism 118 in the distributed file system 106, and thus, are able to access the desired file object, such as a file directory or a file, in the file system volume B. The clients 1 and 3 of the tenant A and the client 4 of the tenant B have passed through both the client-level access and the storage-level access, and thus, are able to access the desired file object, such as a file directory or a file, in the file system volume B. However, the clients 1 and 3 of the tenant A have full access, while the client 4 of the tenant B has read-only access. These access capabilities of the clients 1 and 3 of the tenant A and the client 4 of the tenant B are controlled by the storage-level access control, as explained above with respect to the storage-level access control mechanism. Thus, using the multi-level access control of the distributed computer system 100, clients of different tenants can access file system objects in the same file system volume. One use of this capability would be for one tenant to allow read-only access to clients external to that tenant for research purposes.

Figure 4:
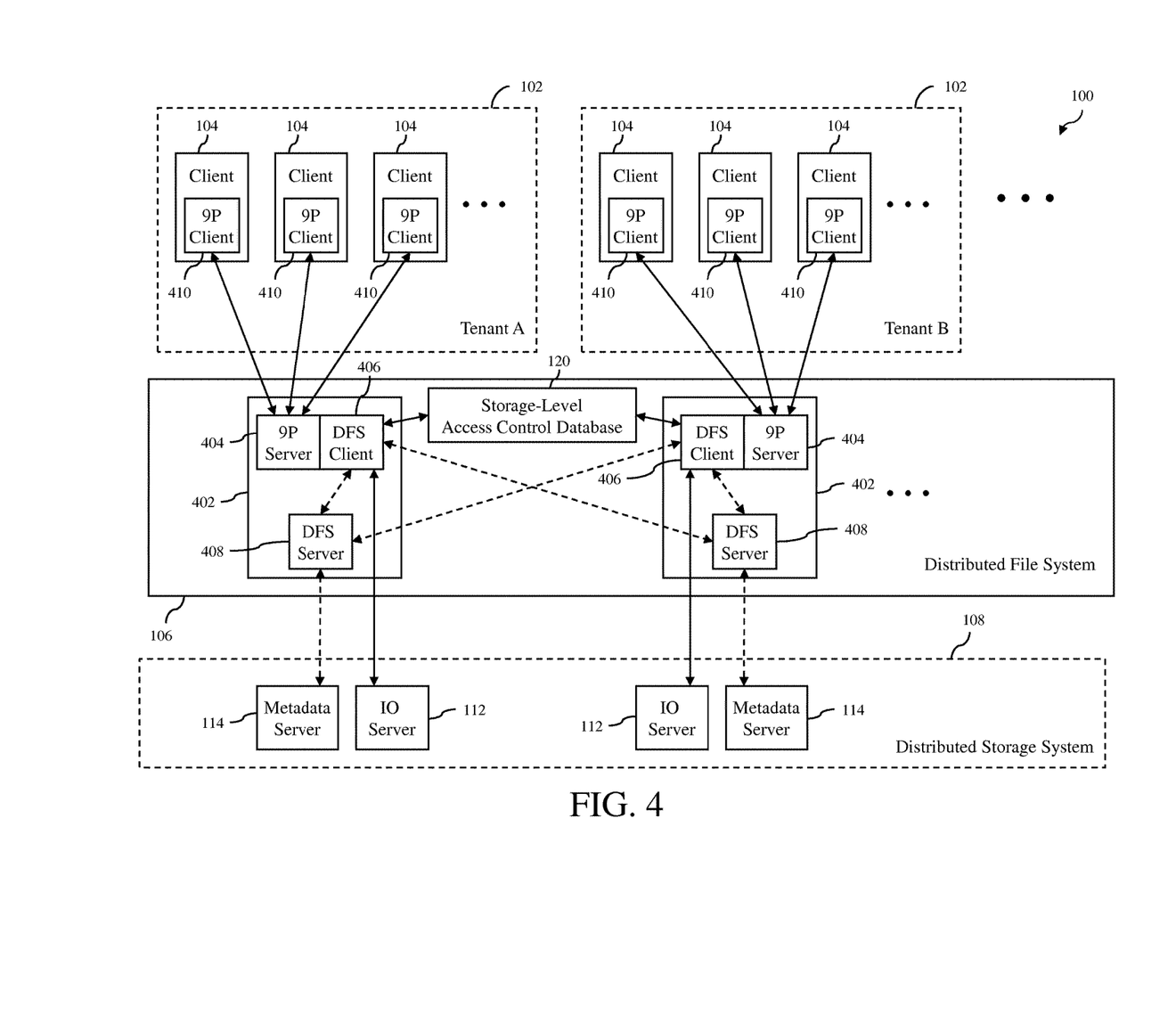
FIG. 4 is a block diagram of the distributed computer system of FIG. 1 in accordance with one implementation.

Turning now to FIG. 4, one particular implementation of the distributed computer system 100 is illustrated. In FIG. 4, the data storage devices 100, as well as other IO and metadata servers, of the distributed storage system 108 are not shown. In this implementation, the distributed file system includes a number of distributed file system (DFS) modules 402, each of which includes a 9P server 404, a DFS client 406 and a DFS server 408. In this implementation, the 9P server of each DFS module is embedded with the DFS client of that DFS module. The 9P servers of the DFS modules communicate with 9P clients 410, which are running in each of the clients 104. Each DFS module and the associated clients 104 are running on the same host computer, e.g., the host computer 200. In this implementation, the client-level access control mechanisms 122 are facilitated by the clients 104 of the different tenants 102, as explained above. The storage-level access control mechanism 118 is facilitated by the DFS clients using the storage-level access control database 120, as explained below.

When one of the clients 104 wants to access a file system object, the 9P client 410 of that client sends a storage access request to the 9P server 404 in the same host computer as the client. The storage access request may include a file system operation being requested and an identification of the requesting client. The storage access request is then processed by the DFS client 406. The DFS client may request file mapping information from the DFS server 408 that communicates with the metadata server 114, which handles storage metadata for the target file system volume of the storage access request. The DFS server may reside in a different host computer from the host computer in which the DFS client resides. The DFS client also enforces the storage-level access control by doing a metadata lookup on the storage-level access control database 120. If the requesting client has access to the target file system volume and the appropriate access capability, the storage access request is transmitted from the DFS client to the IO server that handles the target file system volume to execute the storage access request to get results, which are transmitted back to the requesting client.

Various components of the distributed computer system 100, including the IO servers 112 and the metadata servers 114, the DFS modules 402 and the 9P clients 410, may be implemented in any combination of software, hardware and firmware. In some embodiments, at least some of these components are implemented as one or more software programs running on one or more physical computer systems with one or more processors, memory and other computer components commonly found on a personal computer or a physical server.

Figure 5:
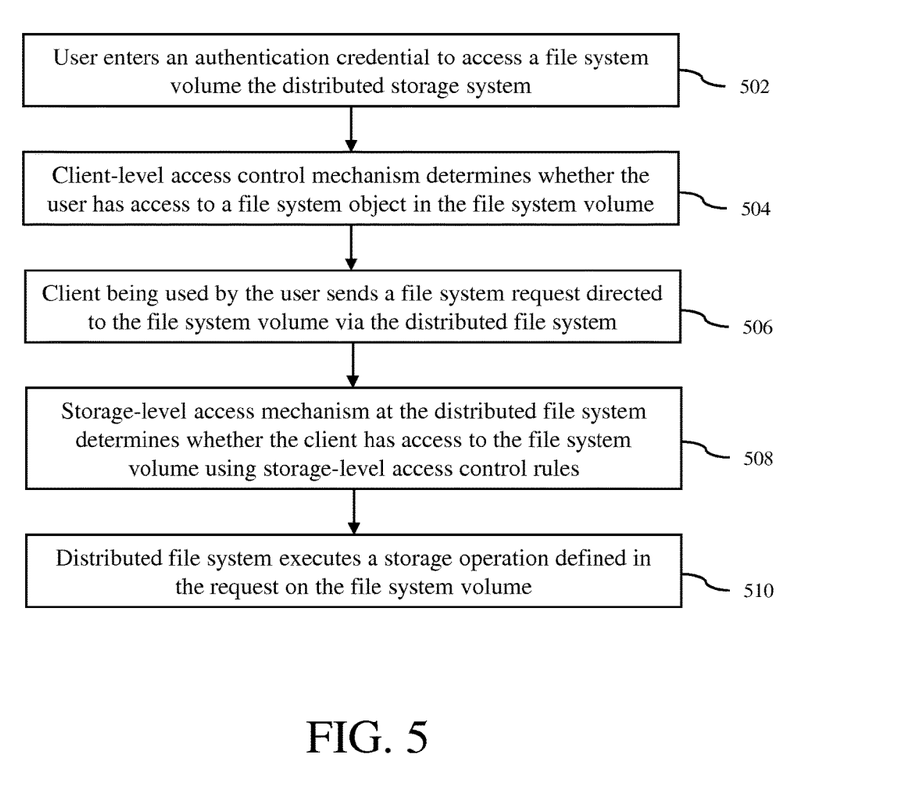
FIG. 5 is a process flow diagram of a storage access operation of the distributed computer system 100 in accordance with an embodiment of the invention.

A storage access operation of the distributed computer system 100 in accordance with an embodiment of the invention is now described with reference to the process flow diagram of FIG. 5. At block 502, a user enters an authentication credential to access a file system volume in the distributed storage system 108 using one of the clients 104. As an example, the user may enter the authentication credential using a computer system connected to a network of one of the tenants 102 that is connected to the client. Next, at block 504, the client-level access control mechanism used at that tenant determines whether the user has access to a file system object in the file system volume. Next, at block 506, the client being used by the user sends a file system request directed to the file system volume via the distributed file system 106. The file system request may include a file system operation being requested and the identification of the requesting client. Next, at block 508, the storage-level access mechanism at the distributed file system determines whether the client has access to the file system volume using storage-level access control rules, which have been previously defined. In one implementation, this access determination step involves examining a storage-level access control database, which includes client-volume access relationships and an access capability for each client-volume access relationship. Next, at block 510, the distributed file system executes a storage operation defined in the request on the file system volume only if access is granted by both the client-level access control mechanism and the storage-level access mechanism.

Figure 6:
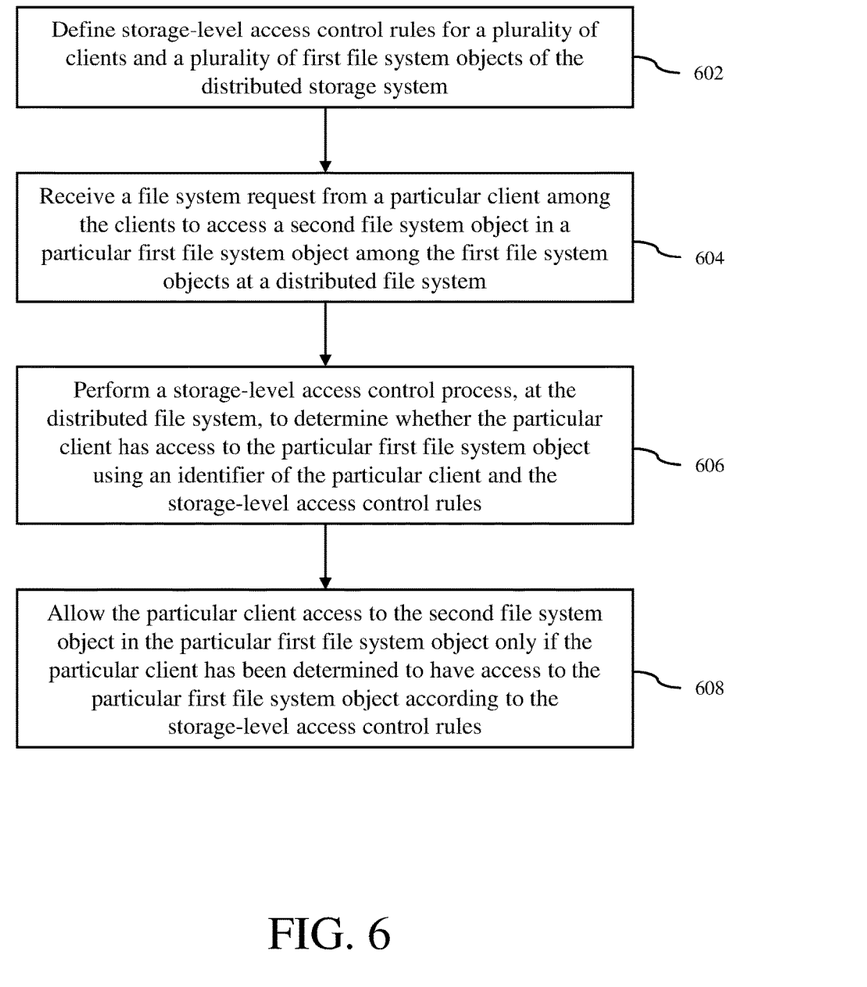
FIG. 6 is a flow diagram of a method for accessing a distributed storage system in accordance with an embodiment of the invention.

A method for accessing a distributed storage system in accordance with an embodiment of the invention is now described with reference to the process flow diagram of FIG. 6. At block 602, storage-level access control rules are defined for a plurality of clients and a plurality of first file system objects of the distributed storage system. At block 604, a file system request is received at a distributed file system from a particular client among the clients to access a second file system object in a particular first file system object among the first file system objects. At block 606, a storage-level access control process is performed, at the distributed file system, to determine whether the particular client has access to the particular first file system object using an identifier of the particular client and the storage-level access control rules. At block 608, access is allowed for the particular client to the second file system object in the particular first file system object only if the particular client has been determined to have access to the particular first file system object according to the storage-level access control rules.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Also, some of the steps can be repeated multiple times.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The components of the embodiments as generally described in this document and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for accessing a distributed storage system, the
    defining storage-level access control rules for a plurality of clients and a plurality of first file system objects of the distributed storage system;
    receiving a file system request from a particular client among the clients to access a second file system object in a particular first file system object among the first file system objects at a distributed file system;
    performing a storage-level access control process, at the distributed file system, to determine whether the particular client has access to the particular first file system object using an identifier of the particular client and the storage-level access control rules;
    allowing the particular client access to the second file system object in the particular first file system object when the particular client has been determined to have access to the particular first file system object according to the storage-level access control rules; and
    prior to performing the storage-level access control process, performing a client-level access control process to determine whether a user has access to the second file system object in the particular first file system object,
    wherein the client-level access control process is implemented using first client-server mechanisms that connect the clients to the distributed file system and the storage-level access control process is implemented using second client-server mechanisms that connect the distributed file system to the distributed storage system, and
    wherein performing the storage-level access control process includes determining an access capability for an access relationship between the particular client and the particular first file system object using the storage-level access control rules.

2. The method of claim 1, wherein the client-level access control process uses an access control list scheme.

3. The method of claim 1, wherein the second file system object is a file directory or a file and the particular first file system object is a file system volume under which the file directory or the file belongs.

4. The method of claim 1, wherein defining storage-level access control rules includes defining sets of clients and sets of first file system objects and defining which of the sets of clients have access to which of the sets of first file system.

5. The method of claim 4, wherein defining storage-level access control rules includes defining an access capability for each set of clients that has access to at least one of the sets of first file system objects.

6. A computer-readable storage medium containing program instructions for a method for accessing a distributed storage system, wherein execution of the program instructions by one or more processors of a computer system causes the one or more processors to perform steps comprising:
defining storage-level access control rules for a plurality of clients and a plurality of first file system objects of the distributed storage system;
receiving a file system request from a particular client among the clients to access a second file system object in a particular first file system object among the first file system objects at a distributed file system;
performing a storage-level access control process, at the distributed file system, to determine whether the particular client has access to the particular first file system object using an identifier of the particular client and the storage-level access control rules;
allowing the particular client access to the second file system object in the particular first file system object when the particular client has been determined to have access to the particular first file system object according to the storage-level access control rules; and
prior to performing the storage-level access control process, performing a client-level access control process to determine whether a user has access to the second file system object in the particular first file system object,
wherein the client-level access control process is implemented using first client-server mechanisms that connect the clients to the distributed file system and the storage-level access control process is implemented using second client-server mechanisms that connect the distributed file system to the distributed storage system, and
wherein performing the storage-level access control process includes determining an access capability for an access relationship between the particular client and the particular first file system object using the storage-level access control rules.

7. The computer-readable storage medium of claim 6, wherein the client-level access control process uses an access control list scheme.

8. The computer-readable storage medium of claim 6, wherein the second file system object is a file directory or a file and the particular first file system object is a file system volume under which the file directory or the file belongs.

9. The computer-readable storage medium of claim 6, wherein defining storage-level access control rules includes defining sets of clients and sets of first file system objects and defining which of the sets of clients have access to which of the sets of first file system.

10. The computer-readable storage medium of claim 9, wherein defining storage-level access control rules includes defining an access capability for each set of clients that has access to at least one of the sets of first file system objects.

11. A distributed computer system comprising:
a plurality of clients running on host computers;
a distributed storage system that includes a plurality of data storage devices; and
a distributed file system that interfaces with the distributed storage system to provide a file system for the clients, the distributed file system that:
receives a file system request from a particular client among the clients to access a second file system object in a particular first file system object among the first file system objects at a distributed file system;
performs a storage-level access control process to determine whether the particular client has access to the particular first file system object using an identifier of the particular client and storage-level access control rules;
allows the particular client access to the second file system object in the particular first file system object when the particular client has been determined to have access to the particular first file system object according to the storage-level access control rules; and
prior to performing the storage-level access control process, perform a client-level access control process to determine whether a user has access to the second file system object in the particular first file system object,
wherein the client-level access control process is implemented using first client-server mechanisms that connect the clients to the distributed file system and the storage-level access control process is implemented using second client-server mechanisms that connect the distributed file system to the distributed storage system, and
wherein the distributed file system determines an access capability for an access relationship between the particular client and the particular first file system object using the storage-level access control rules.

12. The system of claim 11, wherein the client-level access control mechanism uses an access control list scheme.

13. The system of claim 11, wherein the second file system object is a file directory or a file and the particular first file system object is a file system volume under which the file directory or the file belongs.

14. The system of claim 11, wherein the storage-level access control rules are defined using sets of clients, sets of first file system objects, information regarding which of the sets of clients have access to which of the sets of first file system, and information regarding an access capability for each set of clients that has access to at least one of the sets of first file system objects.

* * * * *